Patented Jan. 21, 1947

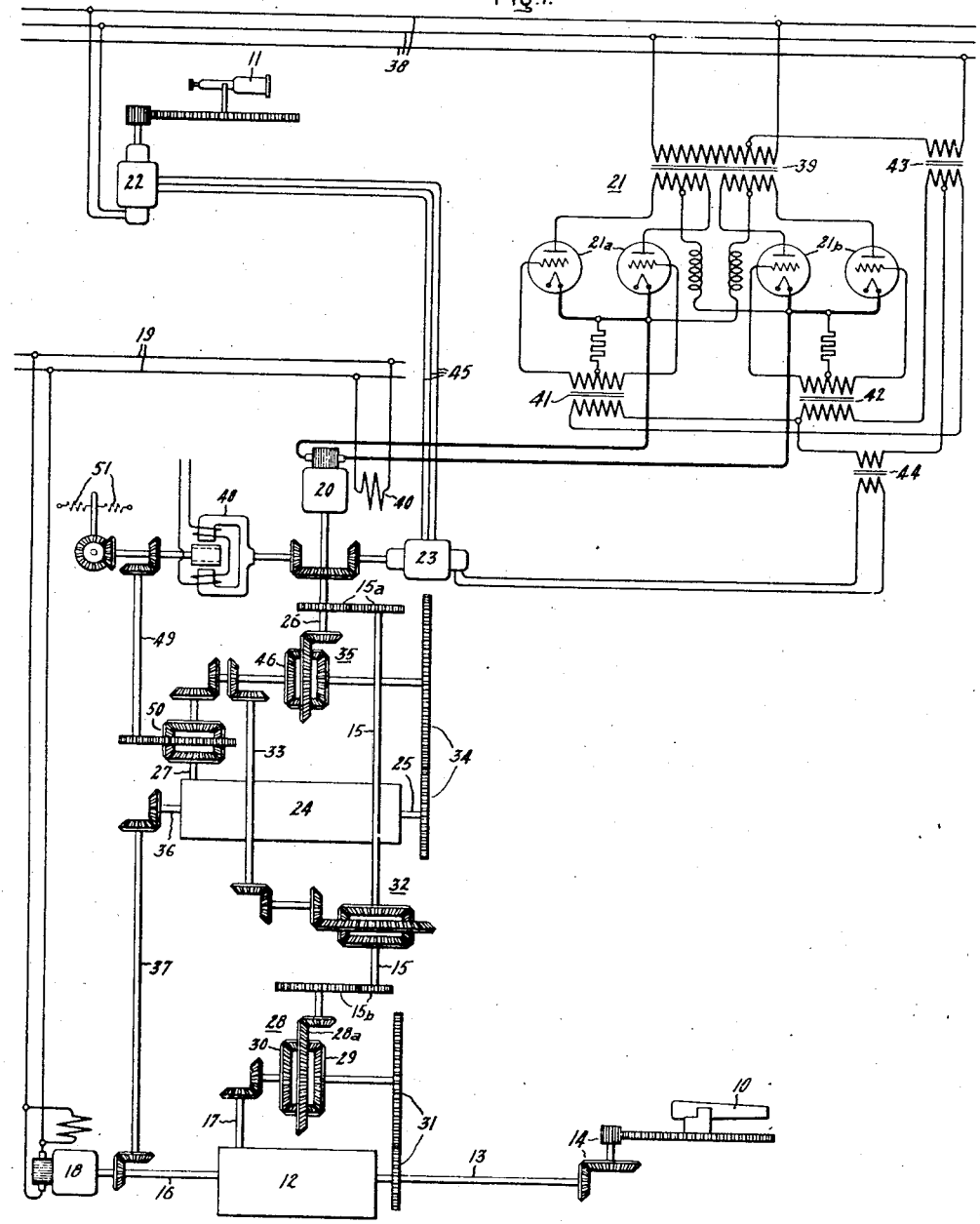

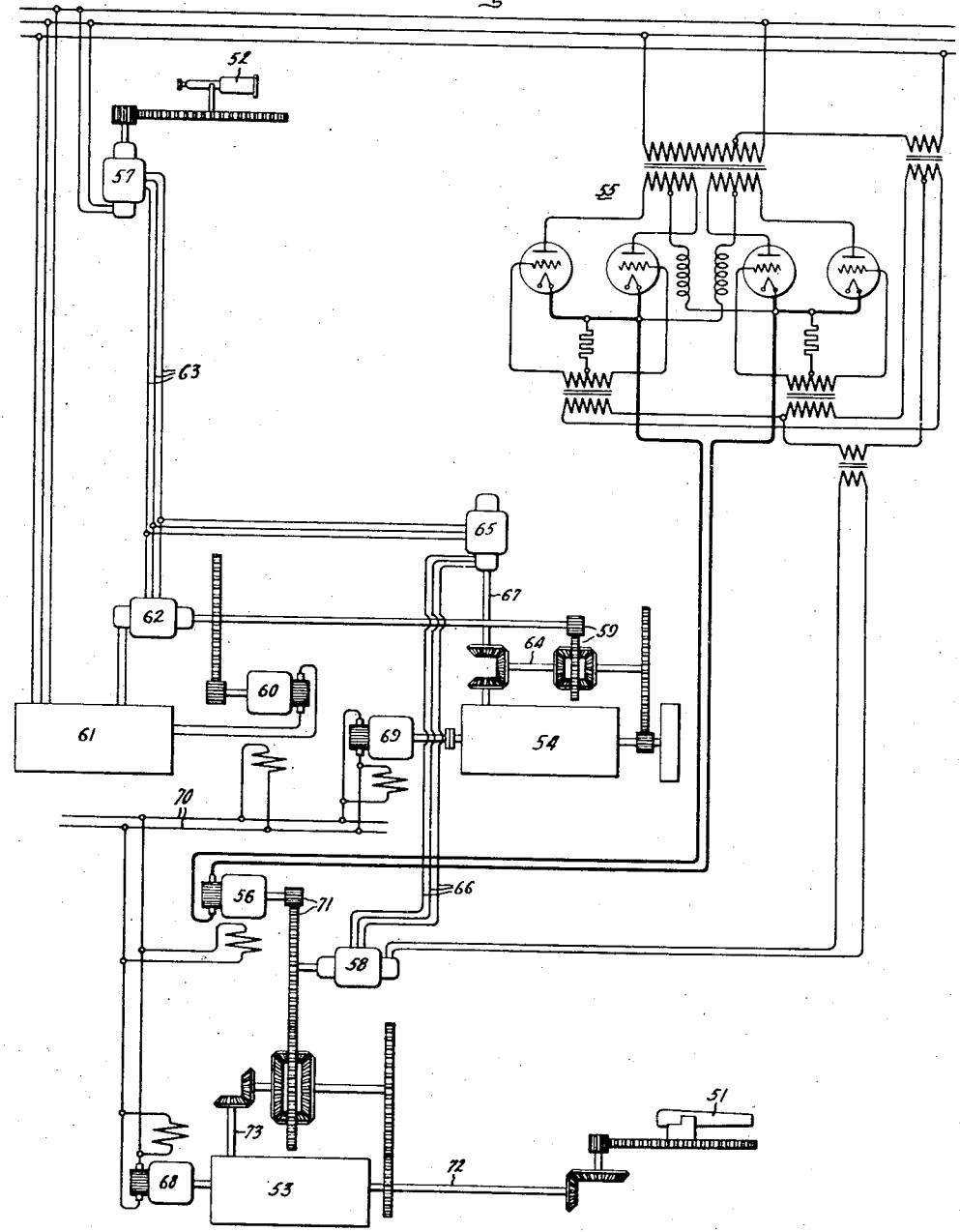

2,414,689

UNITED STATES PATENT OFFICE 2,414,689

FOLLOW-UP CONTROL SYSTEM

Martin A. Edwards, Schenectady, N. Y., assignor to General Electric Company, a corporation of New York Application December 21, 1935, Serial No. 55,596

17 Claims. (Cl. 172—239)

This invention relates to control systems, and more particularly to the class of control systems known as follow-up control systems, and it has for an object the provision of a simple, reliable, accurate and improved system of this character.

If a heavy or massive object is to be driven in correspondence with a light, easily movable pilot device, the control system is often referred to as a "torque amplifier" because a much greater torque is required to move the object than is required to move the pilot device. In systems of this character, means are provided for driving the driven object, and a power control is provided for controlling the supply of power to the driving means. The power control element is influenced differentially by the motion of the pilot device and the driven object. The power control element may be thought of as a throttle member, the opening of which determines the amount of power to be supplied to the driving means. Often the control element is the speed ratio control element of a variable speed transmission device, whose output shaft is connected to drive the driven object. Even in this case, the analogy to a throttle valve is obvious. Assuming the power control element to be in the form of a throttle, full speed of the driven object requires full opening of the power control element. This opening may be represented by an angle, which in a typical case may be 1° of movement of the control element. This full opening for full speed operation is brought about by the driven object lagging the pilot device by an angle which may also, in a typical case, be assumed to be 1°. Thus, at full speed there is an error of 1°. This error is referred to as the dynamic accuracy. An opening of the power control of .1° is usually sufficient to move the driven object slowly from one position to another. Under this condition, there would be a velocity lag error of only .1°. At standstill the error is even less and the accuracy of the system at standstill is known as the static accuracy of correspondence. An accuracy of .1° is sufficient for many industrial applications. In certain applications, however, such for example as in the training or elevation of naval guns in correspondence with a sighting device, still greater accuracy may be required. An important object of this invention is the provision of means for producing an accuracy at full speed equivalent to the accuracy at low speed and for producing a dynamic accuracy of correspondence equal to the static accuracy for those applications in which greater accuracy is required.

This invention is an improvement of the invention disclosed in an application of Ernst F. W. Alexanderson, Serial No. 41,580, Control system, filed September 21, 1935, and assigned to the assignee of the present invention.

In carrying the invention into effect in one form thereof, a device is provided which has an output shaft connected to drive the driven object, an input connection and a control element. A similar device having an output shaft, input connection and control element is also provided. Means are provided for driving the input connections of these devices in substantial correspondence with the pilot device together with means for actuating the control elements to produce rotation of the output shafts at a velocity dependent upon the velocity of the input connections, but lagging the position thereof by an angle proportional to velocity. To eliminate this lag, means are provided for advancing the position of the input connections of the object driving device in accordance with the amount of actuation of the control element of the other device.

In illustrating the invention in one form thereof, it is shown as embodied in a remote control system for causing a gun to reproduce the movement and position of a sighting telescope, but it will be understood of course that the control system has other uses and applications in industry.

For a better and more complete understanding of the invention, reference should now be had to the following specification and to the accompanying drawings in which Fig. 1 is a simple diagrammatical representation of an embodiment of the invention and Fig. 2 is a modification.

Referring now to the drawings, a gun 10, which may be a large gun in the turret of a battleship, is to be rotated in train in correspondence with a pilot device such as the sighting telescope or director 11 so as accurately to reproduce the movement and position of the director. The gun 10 is driven by a suitable driving means 12, to the output shaft 13 of which the gun platform is connected by suitable gearing 14. This driving means 12 is illustrated as a variable speed transmission device having input connections illustrated as a shaft 15, a power shaft 16, and a control element 17 for controlling the direction of rotation of the output shaft 13 and the speed ratio between the power shaft 16 and the output shaft. The power shaft 16 is in turn driven at a speed which is preferably substantially constant, by any suitable driving means, illustrated as an electric motor 18 of the direct current type which is supplied from a suitable source represented by the two supply lines 19. The input connections, that is to say the shaft 15, and associated gearing 15a and 15b are driven in substantial correspondence with the director by suitable means illustrated as an electric motor 20 supplied from suitable electric valve apparatus 21 under the control of an electrical transmitting device 22 connected with the director and an electrical receiver regulating device 23 connected through bevel gearing with the motor 20. Suitable means, illustrated as a variable speed transmission device 24, similar to the device 12 having an output shaft 25, input connections 26 and a control element 27, are provided for advancing the position of the gun 10 to eliminate the error referred to in the foregoing as "velocity lag."

The variable speed transmission driving device 12 is illustrated conventionally because it is a well-known device sold upon the market and because its specific internal structure constitutes no part of the present invention. It is sufficient to understood that the power shaft 16 driven by the motor 18 drives a variable stroke oil pump, which supplies a variable volume of oil to a fluid motor which drives the output shaft 13. The amount of oil supplied to the fluid motor is determined by the position of the control element 17, which when rotated varies the stroke of the oil pump. When no oil is supplied to the oil motor, the output shaft 13 is at rest and when a maximum amount is supplied, the shaft 13 rotates at a maximum speed. Similarly, for intermediate rates of oil supply, the shaft 13 rotates at corresponding intermediate speeds. Also, the direction of rotation of the output shaft 13 depends upon the direction in which the control element 17 is turned from its neutral position.

The control element 17 is actuated through differential gearing 28 whose input spider 28a is connected through suitable gearing with the input connections 15, 15a, 15b. One bevel gear 29 of the differential device is connected through gearing to the output shaft 13 and another bevel gear 30 is connected, as shown, through gearing connections to the control element 17. When the system is at rest, the control element is in its neutral position and the output shaft is stationary. When the motor 20 first begins to turn, the input shaft 15, does not have torque enough to move the heavy load 10, so it turns the control shaft 17 instead, thereby opening the throttle some definite amount. As a result of the rotation of the control shaft, the output shaft 13 would continue to rotate at a speed proportional to the number of rotations of the control shaft if it were not for the fact that the output shaft is connected back through the differential device 28 to the control shaft, so that when the output shaft is rotated it turns the control shaft backward toward its initial position. As the control shaft is turned backward, the speed of the output shaft is of course diminished, and when the control shaft is returned to its initial position, the output shaft is stopped. Thus, it will be seen that with the differential gear 88 connecting the output shaft and the control shaft, the transmission device 12 functions inherently as a follow-up device, and the number of rotations of the output shaft 13 corresponds exactly to the number of rotations of the input shaft 15 in a proportion depending upon the ratio of the gearing 31. However, if the input shaft 15 is rotated continuously, the output shaft 13 will also rotate continuously and at a corresponding velocity but it will lag the input shaft by an amount proportional to the velocity of the output shaft. Clearly the amount of this lag is the same amount that the control shaft 17 would have to be rotated to cause the output shaft 13 to rotate continuously at that velocity if there were no differential follow-up connection between the output shaft 13, the input shaft 15 and the control shaft 17. This amount may be represented by an angle and this angle which is proportional to the velocity of both the input shaft connections and the output shaft is known and referred to in this specification as the velocity lag. In order to eliminate this velocity lag, means are provided for advancing the position of the input shaft an amount corresponding to this lag, i. e. an amount corresponding to the opening of the throttle 17. The output shaft 13 and the load 10 will thereby be brought into correspondence with the pilot device 11 and this correspondence will be maintained at all velocities and not only when the system is at rest. This is accomplished by the inclusion of a differential device 32 in the input connections 15 together with a connection 33 between the input spider of the differential device and the control element 27 of the transmission device 24. The output shaft 25 of the device 24 is connected through gearing 34 and a differential device 35 to the control element 27 and the input spider of the differential device 35 is connected to the motor shaft 26. The power shaft 36 of the transmission device 24 is separately driven at the same velocity or at a velocity proportional to the velocity of the power shaft 16 of the transmission device 12. To this end, the power shaft 36 is connected through suitable driving connections 37 to the power shaft 16. As in the case of the transmission device 12, the output shaft 25 of the transmission device 24 rotates at a velocity proportional to the velocity of the input connections 26 and likewise the control element 27 is actuated to a corresponding extent in order to produce rotation of the output shaft at this velocity. Since the output shaft 13 of the transmission device 12 rotates at a velocity proportional to the velocity of the input connections 15 and since the velocity of the latter connections are either equal to or proportional to the velocity of the input connections 26, it follows that the actuation of the control element 27 is proportional to the velocity of the output shaft 13.

Direct current is supplied to the armature of the electric motor 20 from the electric valve apparatus 21 which comprises a pair of valves 21a for supplying current in one direction to the armature of the motor and a second pair of valves 21b for supplying direct current to the armature in the reverse direction. These valves are in turn supplied from a suitable source of alternating voltage represented by the supply lines 38 through a suitable supply transformer 39, the primary winding of which is connected to the middle and upper supply lines and the secondary windings of which are connected to the anodes of the four valves as illustrated. The motor 20 is provided with a separately excited field winding 40 which is supplied from any suitable separate source of direct current such as that represented by the supply lines 19.

Although the electric valves may be of any suitable type, they are preferably of the three electrode type having a small quantity of an inert gas introduced into the envelope after exhaust. This inert gas may be mercury vapor or any other suitable gas and it serves to convert the usual pure electronic discharge into an arc stream, thereby constituting the valve a grid-controlled arc rectifier. The average value of the current flowing in the anode circuit of electric valves of this character can be controlled by varying the phase relationship between the voltages supplied to the grids and to the anodes respectively. When the grid voltage is substantially in phase with the anode voltage, the current flowing in the anode circuit is maximum and when the grid voltage is lagging with respect to the anode voltage by a predetermined amount, usually more than 90°, the current flowing in the anode circuit is a minimum or substantially zero. For intermediate values of phase relationship between these voltages, the current flow has corresponding intermediate values.

Alternating voltage is supplied to the grids of electric valves 21a and 21b by means of grid transformers 41 and 42 respectively, whose primary windings are connected in series relationship with the secondary winding of a grid biasing transformer 43, one of the terminals of whose primary winding is connected to an intermediate tap of the primary winding of the supply transformer 39 and whose other terminal is connected to the lower supply line 38. This connection of the primary windings of the biasing transformer serves to derive a voltage for the grid or input circuit of the electric valve apparatus which is more than 90° lagging with respect to the anode voltage so that both pairs of valves are normally held at cutoff and therefore supply no current to the armature of the motor 12.

For the purpose of varying the phase relationship between the grid and anode voltages, a component voltage is supplied to the grid or input circuit through a transformer 44, one of whose secondary winding terminals is connected to an intermediate point of the secondary winding of the bias transformer 43 and whose opposite terminal is connected to the common point between the primary windings of the grid transformers 41 and 42. Whenever this component voltage exists, it is substantially in phase with the anode voltage of one of the pairs of valves and, therefore, substantially 180° out of phase with the anode voltage of the other pair of valves. Thus, it will be seen that by varying the magnitude of this component voltage, the phase relationship of the resultant grid voltage, i. e. the vectoral sum of the component voltage and the grid bias voltage, may be varied as desired with the result that the magnitude of the current supplied to the electric motor 12 is correspondingly varied. It will also be seen, that by reversing the polarity of this component voltage and varying its magnitude, the opposite pair of valves will be energized so as to supply a current in the opposite direction to the electric motor, also having a value dependent upon the magnitude of the component voltage. For the purpose of varying the magnitude of the component voltage supplied to the grid circuit of the electric valve apparatus, suitable rotary induction apparatus actuated differentially by the telescope 11 and the gun 10 is provided. This rotary induction apparatus comprises the transmitting device 22 and the receiving device 23.

The transmitting device 22 comprises a rotor member provided with a single circuit winding (not shown) and a stator member provided with a distributed polycircuit winding (not shown) which is physically similar to a three-phase winding. The single circuit rotor winding is connected to the upper and middle supply lines 18. The receiving device 23 is in all respects identical with the transmitting device but its single circuit rotor winding is connected to the primary winding of the transformer 44 and the terminals of the stator windings are connected by means of conductors 45 to corresponding terminals of the stator winding of the transmitting device.

The primary winding of the transmitter 22, when energized, produces an alternating magnetic field by means of which a voltage is induced in the stator winding, thereby causing a current to flow in the stator winding of the receiver 23. This current in turn produces an alternating magnetic field by means of which a voltage is induced in the rotor winding when the relationship between the axis of the rotor winding and the axis of the magnetic field is other than 90°. Therefore, when this 90° relationship obtains, no voltage is induced in the rotor winding and consequently no component voltage is supplied to the grid circuit of the electric valve apparatus with the result that the system is deenergized and at rest.

Whenever the telescope 11 is rotated, the axis of the magnetic field produced by the current in the rotor winding is varied with respect to the axis of the stator winding and this, of course, alters the 90° relationship between the magnetic field of the stator winding of the receiving device and the axis of the rotor winding. As a result, a voltage is induced in the rotor winding of the receiver and is supplied through the transformer 44 to the grid circuit of the electric valve apparatus. This voltage is in phase with the anode voltage of one or the other of the pairs of electric is supplied to the armature of the motor 20 in a direction such as to produce rotation of the motor in a direction dependent upon the direction of rotation of the telescope. However, the drive shaft of the motor 20 is connected through gearing to the rotor member of the receiver 23 so as to produce rotation of the rotor member in a direction to reestablish the 90° relationship between the axis of the rotor winding and the axis of the magnetic field of the stator winding. Therefore, as long as the rotation of the pilot device 11 continues, the motor 20 will continue in rotation and when the pilot device 11 is stopped, the 90° relationship between the axis of the rotor winding of the receiver and the magnetic field of the stator winding is reestablished with the result that the electric valve apparatus 21 is deenergized and the motor 20 is brought to rest. During rotation of the telescope 11, there is of course a very slight angle of lag between the motor shaft and the position of the telescope because some departure from correspondence between the positions of the rotor members of the transmitting and receiving devices is necessary in order to energize the electric valve apparatus. However, since the motor 20 only drives control elements and therefore requires only a small amount of current from the electric valve apparatus, this angle of lag is so slight as to be negligible. For all practical purposes, it may be considered that the motor shaft and the input connections 15 and 26 rotate in synchronism with the pilot device 11.

With the foregoing understanding of the apparatus and its organization in the completed system, the operation of the system itself will readily be understood from the following detailed description.

The rotation of the telescope 11 energizes the electric valve apparatus 21 and causes the motor 20 to drive the input connections 15 and 26 in substantial correspondence with the telescope 11. The rotation of the input connections 15 drives the input spider 28a through the gearing 15b. When the input connections 15 first begin to turn, they do not have sufficient torque to move the heavy gun 10. Consequently, the bevel gear 29 remains stationary and the bevel gear 30 rotates and actuates the control element 17. This will produce rotation of the output shaft 13 and, as explained in the foregoing, owing to the differential connections between the output shaft 13 and the control elements, the output shaft will rotate at a velocity equal to or proportional to the velocity of the input connections 15. If the telescope 11 is being moved at a speed equivalent to the maximum speed at which the variable speed transmission device 12 can drive the gun 10, it will be clear that the output shaft 13 must lag the input connections 15 by the amount necessary to produce the actuation of the throttle 17 required to produce rotation of the output shaft 13 at this velocity. For lesser speeds, of course, the shaft 13 will lag the input connections 15 by a correspondingly smaller amount. It will, therefore, be seen that in the absence of the provision of any special means for preventing it, the gun 10 must lag the telescope 11 by an angle proportional to the velocity of the telescope. As previously pointed out, this would be undesirable and is prevented by advancing the position of the input connections 15 an angle proportional to the velocity of the output shaft 13, which, as pointed out in the foregoing, is proportional both to the velocity of the telescope 11 and to the velocity of the input connections 15 and 26.

In the same manner the control element 27 of the variable speed transmission device 24 is actuated and produces a rotation of the output shaft 25 at a velocity equal to or proportional to the velocity of the input connections and hence equal to or proportional to the velocity of the telescope 11. The rotation of the output shaft 25 at this velocity is of course produced by actuation of the control element 27 a corresponding amount. Since this actuation of the control shaft is produced by rotation of the motor 20 and rotation of the gear 46, and since the shaft 33 is connected through gearing to the bevel gear 46, the shaft 33 will be turned a corresponding amount, that is to say an amount corresponding to the amount of actuation of the control element 27, which as previously pointed out is proportional to the velocity of the output shaft 13. Since the shaft 33 is connected to the input spider of the differential device 32, the lower portion of the input shaft 15 between the differential device 32 and the gearing 15b is advanced in rotation an amount equal to the amount of rotation of the shaft 33. In other words, this portion of the shaft 15 is advanced in position with respect to the telescope 11 by an amount proportional to the velocity of the output shaft 13. This amounts in effect to a momentary increase in the velocity of the input connections for the transmission device 12 which produces an increase in the actuation of the control element 17 and therefore a momentary increase in the velocity of the output shaft 13. As soon as the velocity of the telescope 11 becomes constant the control elements 17 and 27 become stationary and the shaft 33 comes to rest. At this time, the lower portion of the input shaft 15 is rotating at the same velocity as the telescope but in advance thereof by an angle proportional to the velocity of the output shaft 13. Owing to the increased opening of the throttle shaft 17, the output shaft 13 must rotate at a velocity slightly greater than that of the input shaft 15. However, as the gun 10 begins to catch up to its previous position with respect to the input shaft 15, the differential device 28 acts to turn back the control element 17 to its previous position and the gun 10 continues in rotation lagging the input connections 15 by the same amount as before, but, since the input connections are advanced with respect to the telescope 11 by this same amount, the gun is in substantial correspondence with the telescope.

In the foregoing explanation, the factor of acceleration has not been taken into consideration. However, during acceleration the lag is not linearly proportional to velocity, and since the accelerations of the telescope may be quite large, a larger opening of the control element 17 is required to accelerate to a given speed than is required for constant operation at that speed. If such increased opening is not provided, the linear correction introduced into the input connection through the shaft 33 will not completely compensate the lag. In most industrial applications this discrepancy is so slight as to be negligible. However, in certain applications such for example as in gun-fire control, in which very small tolerances are admissible, it becomes necessary to eliminate or substantially to eliminate this error. To this end, a small torque motor 48 is used as a tachometer to measure the acceleration and velocity of the motor 20 which of course are proportional to the acceleration and velocity of the telescope 11. The stator member of this torque motor is connected through gearing to the shaft of the motor 20 and therefore to the shaft of the receiver regulator 23. The rotor member of this torque motor is connected through a shaft 49 and the differential gearing 50 to the control shaft of the small transmission device 24. Suitable spring means 51 are provided for biasing the rotor of the torque motor so as to provide a deflection proportional to the torque of the torque motor 48 and further to cause the rotor to return to a central position when the stator member 48 is stationary. During acceleration of telescope 11 and motor 20, the torque motor, in order to accelerate its rotor member from rest, develops a total torque having component proportional to the acceleration and to the velocity of the telescope. Therefore, it will be seen that the deflection of the rotor member of the torque motor 48 is proportional to the acceleration and velocity of the telescope 11 and this deflection is turned into the differential device 50 in such a direction as to tend to close the control element 27. This, of course, reduces the speed of the output shaft 25 which of course tends to decrease the speed of rotation of the bevel gear 35. However, since the velocity of the input connections 26 remains the same as before the result is to rotate the bevel gear 46 slightly in such a direction as to reopen the control element to the same extent as before in order to produce a rotation of the output shaft 25 equal to that of the input connections 26. This additional rotation of the gear 46 of course produces a further rotation of the shaft 33 and turns a slight additional correction through the differential device 32 into the input connection 15. The ultimate result is to advance the lower portion of the input shaft 15 an amount substantially equal to the error and thus to advance the position of the gun 10 the same amount. As the acceleration decreases to zero and the speed becomes constant, the reverse action takes place and a large part of the correction, i. e. the portion proportional to acceleration is subtracted. However, the portion proportional to velocity remains. The constants of the spring 51 and the ratio of the gearing between the torque motor and input connections 15 are so chosen that this remaining correction is sufficient to compensate the previously mentioned slight velocity lag between the shaft of motor 20 and the telescope 11.

When the telescope 11 is finally brought to rest on a target, the electric valve apparatus 21 is deenergized and the motor 20 becomes stationary. When the motor 20 comes to rest the input connections 15 also come to rest. The gun 10 will continue rotation until, owing to the action of the differential device 28, the control element is returned to its initial neutral position. However, since the input connections 15 are advanced with respect to the telescope 11 it will be clear that the gun 10 would ultimately come to rest in advance of the telescope by this amount unless the correction previously introduced through the differential connection device 32 is taken out during the stopping operation. It will be observed, however, that the input shaft 26 comes to rest simultaneously with the input shaft 15. The output shaft 25 acting through the differential gearing 35, 46 turns the control element 27 back to its initial neutral position and this reverse rotation of the gear 46 produces a corresponding reverse rotation of the shaft 33 thereby taking out the correction previously turned into the input connection 15. As a result the gun 10 is brought to rest in correspondence with the telescope 11.

It is realized that there may be installations in which it is necessary that the variable speed transmission devices 12 and 24 be separated from each other. For example in the case of an installation aboard a battleship, the transmission device 24 may be in the control room whereas the transmission device 12 will be in a turret. In such an installation, the shaft connection 37 between the power shaft 16 and 36 will obviously be impractical. For this type of installation it is contemplated providing an alternator on the shaft 16 and a synchronous motor on the shaft 36 connected to and supplied from this generator.

In the modification of Fig. 2, the gun 51, telescope 52, variable speed transmission devices 53 and 54, electric valve apparatus 55, electric motor 56, transmitting device 57 and receiving device 58 are identical with corresponding elements described in the foregoing description of the system of Fig. 1 and consequently a detailed description of these elements will not be repeated. The arrangement in this modification is different from that of Fig. 1 in that the input connections 59 of the small variable speed transmission device 54 are driven by a second electric motor 60 which in turn is supplied from electric valve apparatus 61 which is identical with the electric valve apparatus 21 and 55. This electric valve apparatus 61 is controlled by means of a receiver regulating device 62 which is identical with the receiver regulating device 58 and is connected in parallel therewith by means of conductors 63 to the transmitting device 57. Instead of introducing the velocity lag correction in to the input connections of the large variable speed transmission device 53 mechanically by means of a shaft and mechanical differential connection to the control element 64 of the small variable speed transmission device, an electrical differential device 65 is included in the connections between the transmitting device 57 and the receiver regulating device 58 for introducing this correction electrically. This electrical differential device 65 has a stator member provided with a three-element distributed winding, the terminals of which are connected to the terminals of the stator winding of the transmitting device 57. It also has a distributed three-element winding on its rotor member the terminals of which are connected by means of conductors 66 to corresponding terminals of the stator winding of the receiver regulator device 58. The rotor member of this electrical differential device 65 is connected by means of a shaft 67 to the control element 64 of the small transmission device 54. The power shaft of the transmission devices 53 and 54 are respectively driven by electric motors 68 and 69, both of which are supplied from a suitable source represented by the two supply lines 70.

In operation, rotation of the telescope 52 energizes the electric valve apparatus 55 and 61 thereby energizing the motors 56 and 60 for rotation in the corresponding direction and velocity, with the result that the input connections 71 and 59 are driven in substantial correspondence with the telescope 52. As in the system of Fig. 1, in the absence of the provision of means for preventing it, the output shaft 72 and the gun 51 will lag the input connections 71 by an angle proportional to velocity. The actuation of the control element 64 of the small variable speed device 54 must of course be proportional to the speed of the output shaft of this device in order to produce a rotation proportional to the velocity of the input connection and since the velocities of the output shaft of both devices 53 and 54 are equal or proportional, the amount of actuation of the control element 64 is proportional to the velocity of the gun 51 and also the telescope 52. Since the rotor member of the electrical differential 65 is geared to the control member 64, actuation of the latter rotates the rotor member through an angle proportional to the velocity of the telescope 52. This has the same effect on the electric valve apparatus and the motor 56 that a rotation of the rotor member of the transmitting device 57 through the same angle would have. Since rotation of the telescope 52 and of the rotor member of the transmitting device 57 through any angle will ultimately produce a rotation of the gun 51 through the same angle it will be clear that rotation of the rotor member of the differential device 65 through the same angle will also produce a rotation of the gun 51 through the same angle. In other words, the effect of rotating the rotor member of the differential device 65 in response to actuation of the control element 64 is to advance the position of the gun 51 through an angle dependent upon the actuation of the control element 64, which, as pointed out in the foregoing, is proportional to the velocity of the output shaft 72. As a result, the gun 51 previously lagging the telescope 52 by this angle, is now brought into accurate correspondence with the telescope and continues in accurate correspondence therewith during the remaining movement of the telescope.

When the telescope 52 is finally brought to rest trained on the target the electric valve apparatus 55 and 61 is deenergized and the output shaft of the devices 53 and 54 acting through the mechanical differential devices return the control shafts 64 and 73 to their initial neutral positions. As the control shaft 64 is restored to its neutral position, the rotor member of the electrical differential device 65 is rotated in the opposite direction from that previously described so that the previously introduced correction in the position of the gun 51 is taken out and the gun 51 comes to rest in accurate correspondence both with its input connections and the telescope 52.

Although in accordance with the provisions of the patent statutes, this invention is described as embodied in concrete form, it will be understood that the elements and their connections and arrangement in the completed system are merely illustrative and the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system for driving an object into positional agreement with a pilot device comprising a driving device having input connections, an output shaft connected to drive said object, and a control element, a second device having input connections, an output shaft and a control element, means for driving said input connections at a velocity proportional to the velocity of said pilot device, means for actuating said control elements to produce rotation of said output shafts at a velocity proportional to the veloctiy of the corresponding input connections, and means for advancing the position of said object an amount proportional to said velocity comprising means for advancing the input connections of said first driving device an amount proportional to the amount of actuation of the control element of said second device.

2. A follow-up control for a pilot device and driven object comprising a driving device having an output shaft connected to drive said object, input connections and a control element, a second device having an output shaft, input connections and a control element, means for driving said input connections at a velocity proportional to the velocity of said pilot device, means for actuating said control elements to produce rotation of said output shafts at a velocity proportional to the velocity of said input connections, and differential means actuated by the control element of said second device for advancing the input connections of said driving device an amount proportional to said velocities thereby to advance the position of said driven object an amount proportional to velocity.

3. A control system for driving an object into positional agreement with a pilot device, comprising driving means for said object having an input shaft, an output shaft connected to said object and a control shaft, a second driving means having an input shaft, an output shaft and a control shaft, means for driving said input shafts at a velocity substantially equal to the velocity of said pilot device, means for actuating said control shafts to cause said output shafts to rotate at a velocity substantially equal to the velocity of said input shafts, and means for advancing the position of said object by an angle proportional to said velocity comprising a connection between the control shafts of said driving means.

4. A follow-up control for a pilot device and driven object comprising a variable speed transmission device having an input shaft, an output shaft connected to drive said object, and a control element, a second transmission device having input and output shafts and a control element, means actuated by said pilot device for driving said input shafts at a velocity substantially proportional to that of said pilot device, means for actuating said control elements to produce rotation of said output shafts at a velocity proportional to the velocity of said input shafts, and means for advancing said object an amount proportional to said velocity comprising means for advancing the input shaft of said object driving device an amount proportional to the amount of actuation of the control element of said second transmission device.

5. A follow-up control for a pilot device and driven object comprising a variable speed transmission device having an output shaft connected to drive said object, a control element and a differential device connecting said shaft and element so that said shaft is controlled to rotate at a velocity proportional to the velocity of the input member of said differential device and to lag the position of said member by an angle proportional to said velocity, a second transmission device having an output shaft, control element and differential device connecting said shaft and element, means for driving the input members of said differential devices at a velocity proportional to the velocity of said pilot device and means for advancing the position of said object an amount proportional to the velocity comprising differential means actuated in accordance with the actuation of the control member of said second device for advancing the input member of said object driving device an amount proportional to velocity.

6. A control system for a pilot device and driven object comprising a device having an output shaft connected to drive said object, a control element and input connections, a second device having an output shaft, a control element and input connections, means for driving said input connections at a velocity, dependent upon the velocity of said pilot device, means for actuating said control elements to produce rotation of said output shafts at a velocity dependent upon the velocity of said input connections, and means for advancing the position of said object an amount proportional to said velocity comprising means actuated in accordance with the actuation of the control element of said second device for adding a correction into the input connections of said object driving device when said pilot device is accelerated and for subtracting said correction when said pilot device is stopped.

7. A follow-up control for a pilot device and driven object comprising a device having an output shaft connected to drive said object, input connections and a control element, a second device having an output shaft, input connections and control element, electric motor means controlled by said pilot device for driving both said input connections in positional correspondence with said pilot device, means for actuating said control elements to produce rotation of said output shafts at a velocity dependent upon the velocity of said input connections and lagging the rotation of said connections by an angle proportional to said velocity, and means for advancing said object an amount substantially equal to said angle comprising differential means actuated in accordance with the actuation of the control element of said second device for introducing a correction through the input connections of said driving device during movement of said pilot device and for subtracting said correction when said pilot device is stopped.

8. A follow-up system comprising in combination with a pilot device and driven object, a device for driving said object having an output shaft connected to said object, an input shaft and a control element, a differential device connected in said input shaft, a second device having output and input shafts and a control element, an electric motor controlled by said pilot device for driving said input shafts in substantial correspondence therewith, means responsive to angular disagreement of said input and output shafts for actuating said control elements to produce rotation of said output shafts at a velocity dependent upon said angular disagreement, and means for advancing the position of said object substantially to eliminate velocity lag comprising a driving connection between the control element of said second device and the input member of said differential device for advancing the position of the input shaft of said driving device an amount dependent upon the velocity of said input shafts.

9. A follow-up control system for a pilot device and driven object comprising a pair of driving devices each having an input shaft, a control member, an output shaft and a differential device interconnecting said shafts and control member whereby said output shaft is caused to rotate at a velocity dependent upon the velocity of said input shaft and lagging said input shaft by an angle dependent upon said velocity, a driving connection between the output shaft of one of said devices and said object, a differential device connected in the input shaft of said object driving device, electric valve apparatus controlled by said pilot device and an electric motor energized by said valve apparatus for driving said input shafts substantially in correspondence with said pilot device, and means for advancing the position of said object substantially to eliminate the angle of lag comprising a driving connection between the input member of the differential device in the input shaft of said object driving device and the control element of the other driving device.

10. A follow-up control for a pilot device and driven object comprising a driving device having an input connection, a control element and an output shaft connected to drive said object, a second driving device having input connection, control element and output shaft, means for driving said input connections in substantial correspondence with said pilot device, means for actuating said control elements to produce rotation of said output shafts at a velocity dependent upon the velocity of said input connections and lagging said connections by an angle dependent upon said velocity, and means for advancing the position of said object an amount proportional to said velocity comprising means for introducing a correction dependent upon the actuation of the control element of said second driving device into the input connections of said object driving device and means actuated by said input shaft driving means for introducing an additional correction into the control element of said second driving device.

11. A follow-up control for a pilot device and driven object comprising a device for driving said object having an output shaft connected to said object, an input shaft and a control element, a second device having an output shaft, input shaft and control element, means actuated by said pilot device for driving said input shafts in substantial correspondence with said pilot device, means comprising a differential device interconnecting the output shaft, input shaft and control of each of said driving devices for producing rotation of said output shafts at a velocity proportional to the velocity of said input shafts, a differential driving connection from the control element of said second driving device to the input shaft of said object driving device for advancing the position of said last-mentioned shaft an amount dependent upon the velocity of said input shaft, and means for advancing the input shaft of said first driving device an additional amount comprising a torque motor actuated by said input shaft driving means and a differential connection between said motor and the control element of said second driving device.

12. A follow-up control system comprising in combination a pilot device, a driven object, a device for driving said object having an output shaft connected to said object, a control element, and a differential device connecting said shaft and element, a second driving device having an output shaft, control element and differential device connecting said shaft and element, driving means connected to the input members of said differential devices, means for controlling said driving means to drive said input members in substantial correspondence with said pilot device comprising an electrical transmitting device connected to said pilot device, an electrical receiving device connected to said driving means and electrical connections between said transmitting and receiving devices, and means for advancing the position of said driven object an amount dependent upon the velocity of said pilot device comprising an electrical differential device included in the connections between said transmitting device and the receiving device associated with said object driving device and actuated in accordance with the actuation of the control element of said second driving device.

13. A follow-up control system comprising a pilot device, a driven object, a variable speed transmission device for driving said object having input connections, an output shaft connected to said object and a control element, a second variable speed transmission device having input connections, output shaft and control element, driving means for said connections, means for controlling said driving means to drive said connections in substantial correspondence with said pilot device comprising a transmitting device connected to said pilot device, a receiving device connected to said driving means and electrical connections between said transmitting and receiving devices, means for producing rotation of said output shafts lagging said input connections in accordance with the velocity thereof, and means for advancing the position of said driven object an amount proportional to velocity comprising an electrical differential device included in the electrical connections between said transmitting device and the receiving device associated with said object driving device and actuated in accordance with the actuation of the control element for said second transmission device.

14. A follow-up control comprising in combination with a pilot device and driven object, a variable speed transmission device having an output shaft connected to drive said object, an input connection and a control element, a second transmission device having an output shaft, input connection and control element, and electric motor connected to the input connection of said first device, a second electric motor connected to the input connection of said second device, means for controlling said motors to drive said input connections in substantial correspondence with said pilot device comprising an electrical transmitting device connected to said pilot device, an electrical receiving device connected to each of said motors and electrical connections between said transmitting device and said receiving devices, means for actuating said control elements to produce rotation of said output shafts lagging said input connections by an amount dependent on the velocity thereof and means for advancing the position of said object to eliminate said lag comprising an electrical differential device included in the connections between said transmitting device and the receiving device connected to said first motor and actuated in accordance with the actuation of the control element of said second transmission device.

15. The combination with a driven object and a remote directing instrumentality, of means to drive said object, means to cause said driving means to operate at a rate proportional to the velocity of said instrumentality, and control devices including electric valve apparatus and differential gears connecting said instrumentality to said driving means, said differential gears being interposed between said valve apparatus and said driving means.

16. The combination with a driven object and a remote directing instrumentality, of position transmitting means actuatable by said instrumentality, receiving means actuable by said transmitting means, means to drive said object, and means including electric valve devices and differential gears to cause the operation of said driving means proportionally to the velocity of said instrumentality, said differential gears being interposed between said valve apparatus and said driving means.

17. The combination with an angularly driven object and an angularly movable directing instrumentality, of a variable speed transmission device connected to position said object in accurate angular agreement with said instrumentality and having a control element, position transmitting means geared to said instrumentality, angular position receiving means connected to be driven by said transmitting means, electric valve means whereof the operation is controlled by said receiving means, and operating connections between said electric valve means and said control element.

MARTIN A. EDWARDS.

Certificate of Correction

Patent No. 2,414,689.   January 21, 1947.

MARTIN A. EDWARDS

It is hereby certified that errors appear in the printed specification of the above numbered patent requiring correction as follows: Column 3, line 68, for "gear 88" read *gear 28*; column 6, line 36, strike out the words "valves, the result of which is that direct current" and insert the same after "electric" in line 39, same column; and that the said Letters Patent should be read with these corrections therein that the same may conform to the record of the case in the Patent Office.

Signed and sealed this 24th day of June, A. D. 1947.

[SEAL]

LESLIE FRAZER,
*First Assistant Commissioner of Patents.*